United States Patent [19]

Ogasawara

[11] 4,449,147
[45] May 15, 1984

[54] SELF-SCANNING PHOTODIODE ARRAY

[75] Inventor: Fumihiro Ogasawara, Tokyo, Japan

[73] Assignee: Ricoh Company, Ltd., Tokyo, Japan

[21] Appl. No.: 207,102

[22] Filed: Nov. 14, 1980

[30] Foreign Application Priority Data

Nov. 19, 1979 [JP] Japan ................................ 54-148909

[51] Int. Cl.³ .................... H04N 1/10; H04N 3/12
[52] U.S. Cl. .................................. 358/212; 358/213; 358/293
[58] Field of Search .............. 358/109, 208, 212, 213, 358/199, 285, 293, 294; 250/209, 211 J, 578; 357/24 LR; 307/311; 340/146.3 F; 356/343

[56] References Cited

U.S. PATENT DOCUMENTS

| | | | |
|---|---|---|---|
| 4,093,957 | 6/1978 | King et al. | 357/30 |
| 4,109,284 | 8/1978 | Tompkins | 358/212 |
| 4,134,135 | 1/1979 | Inokuchi et al. | 358/294 |
| 4,233,632 | 11/1980 | Akiyama | 358/212 |
| 4,296,441 | 10/1981 | Ogasawara | 358/293 |

OTHER PUBLICATIONS

Thompson, "Time-Delay-and-Integration Charge Coupled Devices (CCDs) Applied to the Thematic Mapper", *SPIE*, vol. 143, Applications of Electronic Imaging Systems, (1978), pp. 19-26.

*Primary Examiner*—Tommy P. Chin
*Attorney, Agent, or Firm*—David G. Alexander

[57] ABSTRACT

A linear photosensor array is inclined relative to a direction of reciprocating movement thereof. Photosensor elements (4) of the array are self-scanned in one direction while the array is moved in a forward direction and in the opposite direction while the array is moved in a reverse direction after indexing movement perpendicular to the direction of reciprocation.

6 Claims, 6 Drawing Figures

SELF-SCANNING PHOTODIODE ARRAY

BACKGROUND OF THE INVENTION

The present invention relates to an improved self-scanning photodiode array. In the prior art, such an array comprises a plurality of photodiodes arranged in a row. The array is moved in a forward horizontal direction while the outputs of the photodiodes are sequentially scanned to produce output signals. This operation is performed many times during the forward movement of the array to scan a rectangular area of an original document for electrostatic copying, facsimile transmission or the like. The array is inclined relative to the forward scan direction rather than perpendicular thereto by an angle depending on the geometry of the array and the speed of movement thereof so that the output signals represent points on the document which lie on a straight vertical line. After this operation is completed, the document is moved by a distance equal to the height of the array for indexing and the array is returned in a reverse horizontal direction to its home position. Then, the operation is repeated to scan an adjacent rectangular area of the document.

In this prior art arrangement, no scanning is performed during the reverse or return movement of the array and this time is effectively wasted. Although the scanning operation could be performed during the reverse movement, it would result in a distorted reproduction due to the inclination of the array. Means for reversing the inclination of the array for scanning in the reverse direction may be provided, but would constitute an excessively complicated mechanical arrangement.

SUMMARY OF THE INVENTION

A photosensor array embodying the present invention includes a plurality of photosensor elements and is characterized by comprising scanning means for selectively sequentially scanning the photosensor elements in a forward direction and a reverse direction.

In accordance with the present invention, a linear photosensor array is inclined relative to a direction of reciprocating movement thereof. Photosensor elements of the array are self-scanned in one direction while the array is moved in a forward direction and in the opposite direction while the array is moved in a reverse direction after indexing movement perpendicular to the direction of reciprocation.

It is an object of the present invention to provide an improved self-scanning photodiode array which enables scanning during both forward and reverse movement of the array.

It is another object of the present invention to provide a generally improved photodiode array.

Other objects, together with the foregoing, are attained in the embodiments described in the following description and illustrated in the accompanying drawing.

DESCRIPTION OF THE PREFERRED EMBODIMENTS

While the photodiode array of the present invention is susceptible of numerous physical embodiments, depending upon the environment and requirements of use, substantial numbers of the herein shown and described embodiments have been made, tested and used, and all have performed in an eminently satisfactory manner.

Figure 1:
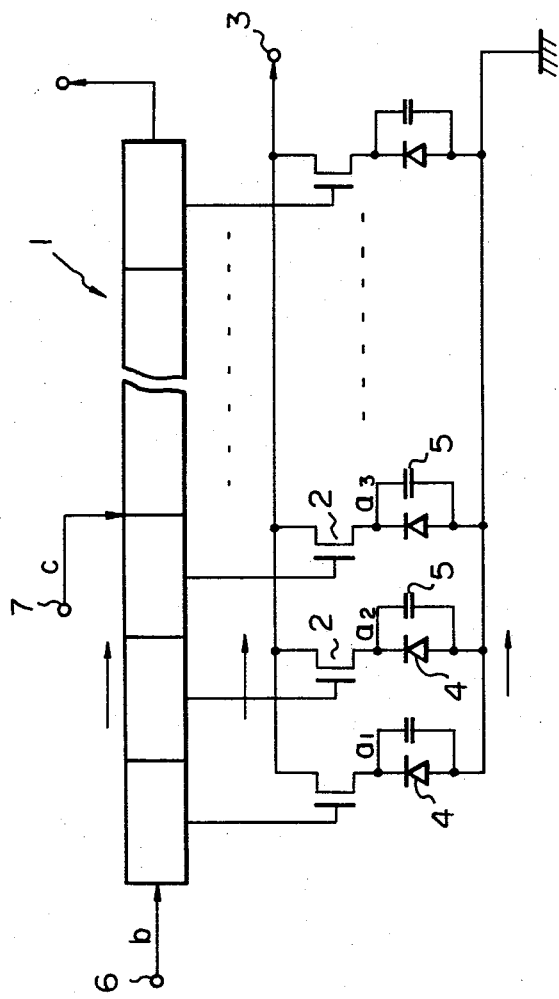
FIG. 1 is a circuit diagram of a prior art self-scanning photodiode array (P.D.A.)

A prior art self-scanning photodiode array or P.D.A. includes, as shown in FIG. 1, a shift register 1, a plurality of switch elements 2 actuated by outputs of respective stages of the shift register 1, photodiodes 4 adapted to produce output signals a ($a_1$, $a_2$ ... ) proprotional to the amounts of incident light when the associated switch elements 2 are turned on, and capacitors 5. The shift register 1 reveives a shift signal b at its terminal 6 and shift clock pulses c at its terminal 7. The shift clock pulses c successively shift the input shift signal b as indicated by an arrow in the drawing so that the individual switch elements 2 are sequentially turned on or scanned as indicated by an arrow. Thus, video signals a corresponding to the amounts of light up to then incident on the individual photodiodes 4 appear at an output terminal 3 in succession.

Meanwhile, a prior art image data reading system has been proposed which arranges the photodiode array of the above construction in the vertical scan direction and drives it for reciprocation in the horizontal direction to successively read image data on a document.

This previous proposal, however, merely moves the photodiode array back to its start or home position in a rearward stroke without reading any data though permitting it to read data in a forward stroke.

The result is an increase in the number of reciprocal strokes, an increase in the fatigue of the drive mechanism and an increase in the time period necessary for scanning data. It has therefore been desired to scan data on a document both in forward and rearward strokes of the photodiode array.

In this type of image data reading system, the photodiode array needs to read image data in a set of bits along the vertical direction in each predetermined horizontal scan position A while moving in the horizontal scan direction. To read all of the bits of image data at each position A, the photodiode array must be inclined a given angle $\theta$ relative to the vertical scan direction as shown in FIG. 2 in due consideration of the self-scanning rate of the photodiode array and its moving velocity.

Figure 2:
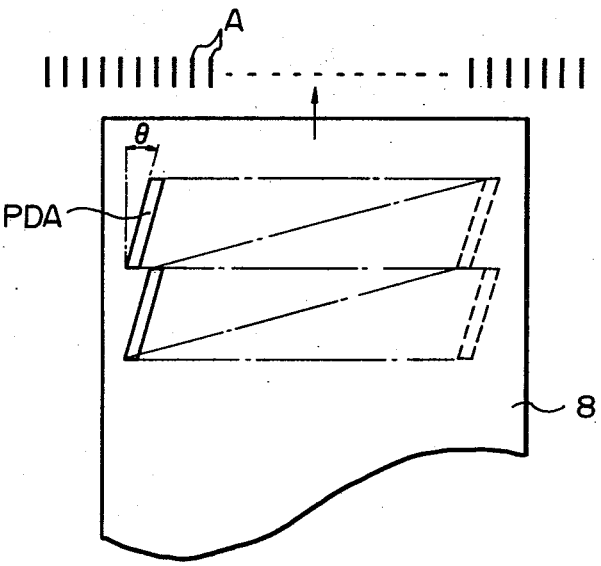
FIG. 2 is a schematic illustration of an image data reading system developed previously.

In FIG. 2, the reference numeral 8 denotes a document which will remain stationary during forward strokes of the photodiode array but will be fed vertically as indicated by an arrow through the readable width of the array upon completion of a reading operation.

Consequently, the photodiode array cannot read data on a document during reverse strokes unless its inclination relative to the vertical scan direction is inverted or reversed from that for forward strokes. Therefore, intricate mechanisms and controls are required. Difficulty has thus been experienced in setting up an image data reading system capable of reading data during return strokes.

Figure 3:
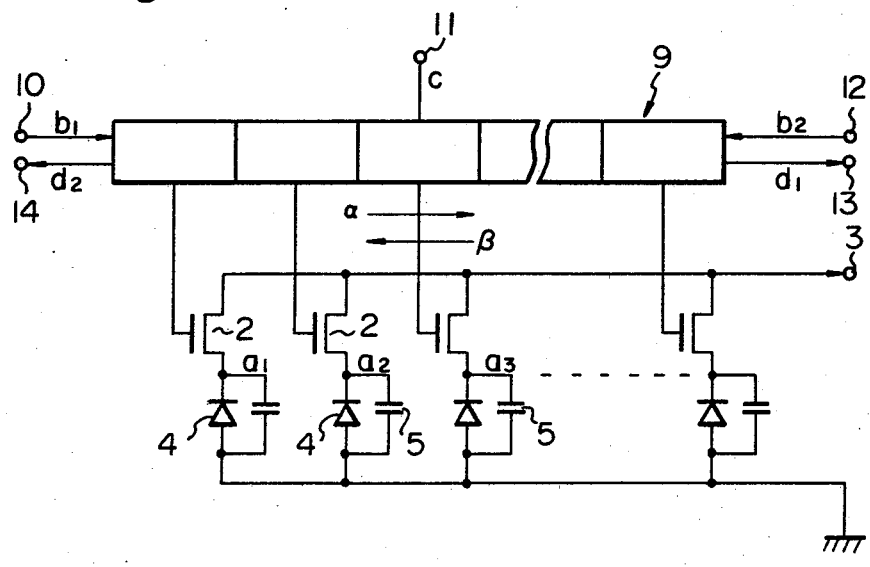
FIG. 3 is a circuit diagram of a self-scanning photodiode array according to the present invention.

Referring to FIG. 3, there is shown in diagram form a photodiode array according to a first embodiment of the present invention. In FIG. 3, the same reference numerals and characters as those of FIG. 1 designate corresponding parts.

The photodiode array shown differs from the prior art arrangement of FIG. 1 in that it employs a reversible or bidirectional shift register 9 for successively actuating switch elements 2.

The reversible shift register 9 receives a shift signal $b_1$ at an input terminal 10 and shift clock pulses c at a shift clock input terminal 11. When the shift signal $b_1$ is shifted by shift clock pulses c, the individual switch elements 2 are turned on in succession or sequentially in the direction indicated by an arrow $\alpha$ so that an output terminal 3 produces video signals $a_1$, $a_2$, $a_3$ . . . , the levels of which correspond to the amounts of light incident on individual photodiodes 4.

When a shift signal $b_2$ is coupled to a second input terminal 11 of the shift register 9 and shift clock pulses c to the terminal 11, the switch elements 2 will be turned on successively in an opposite direction $\beta$ causing video signals a to appear at the output terminal 3 in the opposite order. The circuitry also includes terminals 13 and 14 for producing end-of-scan signals $d_1$ and $d_2$ individually.

Figure 4:
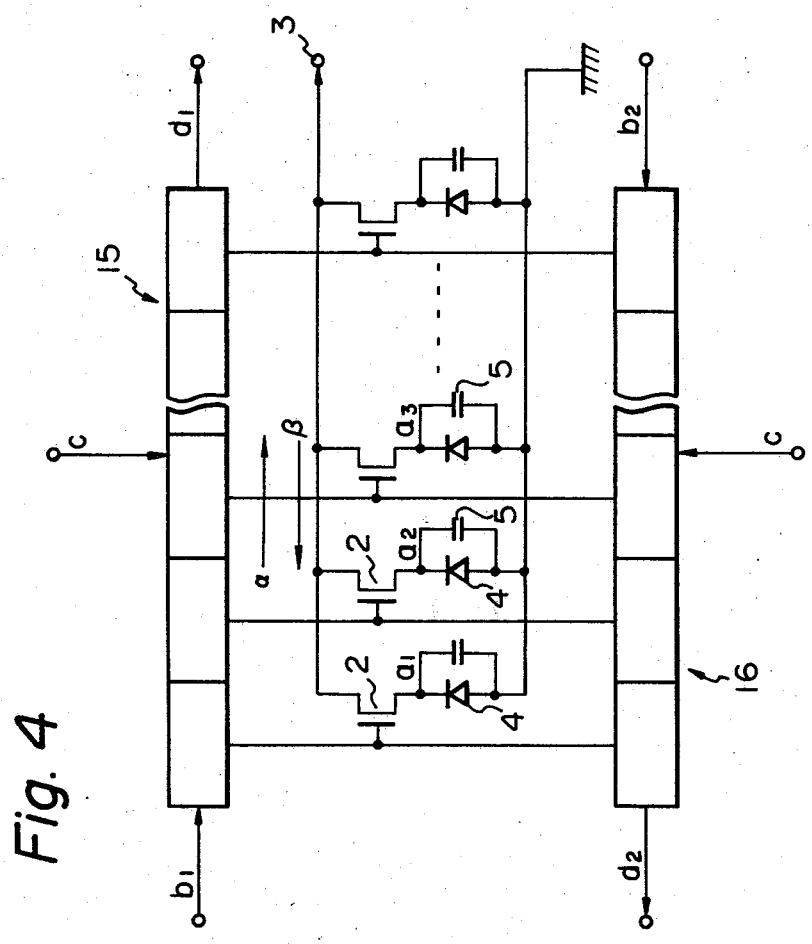
FIG. 4 shows a photodiode array according to another embodiment of the present invention.
Figure 5:
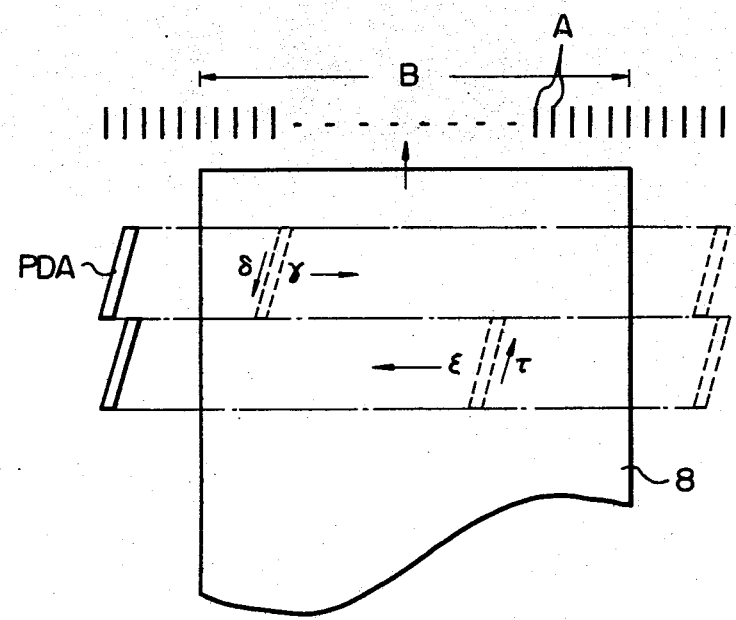
FIG. 5 demonstrates an image data reading system according to the present invention.

A second embodiment of the photodiode array of the invention is shown in FIG. 4, in which the same reference numerals and characters as those of FIG. 3 denote the same or corresponding parts.

In this embodiment, the reversible shift register 9 is replaced by the combination of a first shift register 15 for driving the switch elements 2 in the direction $\alpha$ and a second shift register 16 for driving them in the direction $\beta$.

By selectively using the shift registers 15 and 16, a series of video signals can be caused to appear at the output terminal 3 in either one of the directions $\alpha$ and $\beta$.

Figure 6:
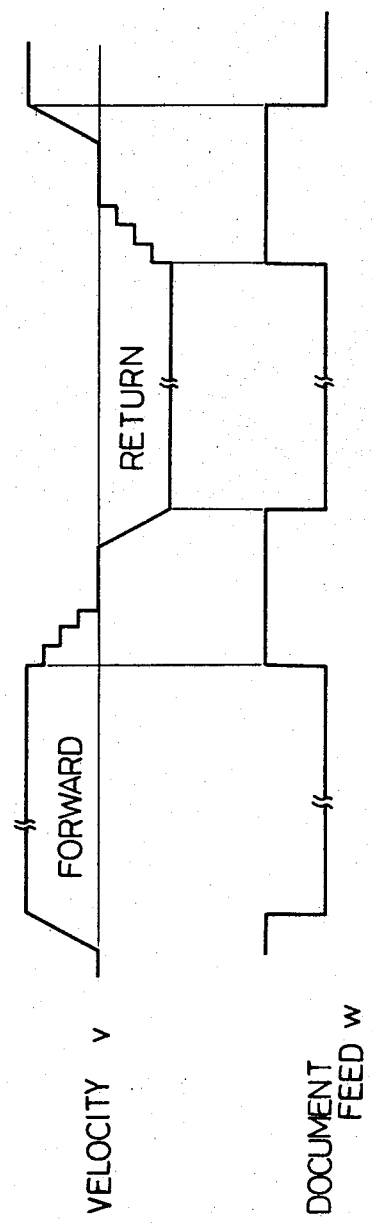
FIG. 6 is a timing chart showing a relationship between the movement of the photodiode array and vertical feed of a document which occurs during operation of the system.

The photodiode array arranged in the manner described is inclined at a predetermined angle $\theta$ to the horizontal scan direction along the document 8 and driven for reciprocation in the horizontal scan direction along the document 8. While the photodiode array is moving through a reading range B on the document 8, its velocity v is kept constant as indicated in FIG. 6. Every time the photodiode array moves beyond the predetermined range B, the document 8 is fed vertically by a distance equal to the readable vertical width of the photodiode array as indicated by w in FIG. 6. In a forward stroke wherein the photodiode array moves in the direction of an arrow $\gamma$, the switch elements 2 of the photodiode array are scanned successively from the top to the bottom as indicated by an arrow $\delta$ at each of the predetermined positions A so as to deliver successive video signals a. In a reverse stroke wherein the photodiode array moves in the direction of an arrow $\xi$, the switch elements 2 are scanned from the bottom to the top in the direction of arrow $\tau$ at each position A to produce video signals a. In this way, video signal bits along the vertical scan direction can be produced at each of the predetermined horizontal scan positions A.

Obviously, this image information reading system produces video signals in a rearward stroke in a horizontally and vertically opposite relation to video signals which appear in a forward stroke. However, merely by storing the output video signals in a buffer memory in reversed order, a plurality of lines of video signals can be stored in the buffer memory as if a document were scanned always from the top to the bottom and from the left to the right.

As has thus far been described, a photodiode array according to the present invention is of a self-scanning type which can scan a document in its forward and reverse strokes. The photodiode array is inclined at a predetermined angle relative to the vertical scan direction. This array reciprocates horizontally along a document and reads image data in opposite manners during its forward and rearward strokes. Hence, the photodiode array produces accurate image data for each predetermined position along the horizontal scan direction and readily reads image data in the course of its forward and reverse strokes. This facilitates high speed scanning with a reduced number of reciprocal strokes.

In summary, it will be seen that the present invention provides an improved photodiode array which enables scanning in both reciprocating directions. Various modifications will become possible for those skilled in the art after receiving the teachings of the present disclosure without departing from the scope thereof.

What is claimed is:

1. A photosensor array including a plurality of photosensor elements characterized by comprising scanning means for selectively sequentially scanning the photosensor elements in a forward direction and a reverse direction;

the scanning means comprising a plurality of switch means connected between an output terminal of the array and the respective photosensor elements, shift register means having a plurality of parallel outputs connected to switch terminals of the respective switch means and shift means for shifting a signal through the shift register means, the signal turning on one of the switch means when the signal appears at the respective parallel output of the shift register means.

2. An array as in claim 1, in which the shift register means comprises a bidirectional shift register, the shift means being constructed to selectively shift the signal from a first end of the shift register to a second end of the shift register and vice-versa.

3. An apparatus as in claim 1, in which the shift register means comprises first and second shift registers having parallel outputs which are connected together respectively to constitute said parallel outputs of the shift register means, the shift means being constructed to selectively shift the signal through the first and second shift registers in opposite directions.

4. An apparatus as in claim 1, in which the photosensor elements comprise photodiodes.

5. An apparatus as in claim 4, in which the photosensor elements further comprise capacitors connected in parallel with the respective photodiodes.

6. A photosensor array including a plurality of photosensor elements characterized by comprising scanning means for selectively sequentially scanning the photosensor elements in a forward direction and a reverse direction; and drive means for integrally moving the photosensor elements in a forward direction and a reverse direction, the photosensor elements being arranged in a row which is inclined relative to the forward and reverse directions, the scanning means scanning the photosensor elements in the forward direction when the drive means moves the photosensor elements in the forward direction and vice-versa.

* * * * *